US012487064B2

(12) United States Patent
Rowe et al.

(10) Patent No.: US 12,487,064 B2
(45) Date of Patent: Dec. 2, 2025

(54) LIGHTWEIGHT END CAP

(71) Applicant: BAE SYSTEMS plc, London (GB)

(72) Inventors: Nathan William Rowe, Crewe (GB); Joshua Matthew Stubbs, Crewe (GB); Paul Heaton, Crewe (GB); Richard James Duncombe, Farnborough (GB)

(73) Assignee: BAE SYSTEMS PLC, London (GB)

( * ) Notice: Subject to any disclaimer, the term of this patent is extended or adjusted under 35 U.S.C. 154(b) by 122 days.

(21) Appl. No.: 18/558,977

(22) PCT Filed: Apr. 19, 2022

(86) PCT No.: PCT/GB2022/050967
§ 371 (c)(1),
(2) Date: Nov. 3, 2023

(87) PCT Pub. No.: WO2022/234245
PCT Pub. Date: Nov. 10, 2022

(65) Prior Publication Data

US 2024/0230291 A1 Jul. 11, 2024

(30) Foreign Application Priority Data

May 5, 2021 (EP) .................................... 21275054
May 5, 2021 (GB) .................................. 2106391.2

(51) Int. Cl.

| | |
|---|---|
| ***F42B 5/285*** | (2006.01) |
| ***F42B 5/307*** | (2006.01) |
| ***F42C 19/08*** | (2006.01) |
| *B33Y 80/00* | (2015.01) |

(52) U.S. Cl.
CPC .............. *F42B 5/285* (2013.01); *F42B 5/307* (2013.01); *F42C 19/083* (2013.01); *B33Y 80/00* (2014.12)

(58) Field of Classification Search
CPC .... F42B 5/181; F42B 5/26; F42B 5/28; F42B 5/285; F42B 5/29; F42B 5/295; F42B 5/297; F42B 5/30; F42B 5/307; F42B 5/313; F42C 19/083
USPC .................................................. 102/464–470
See application file for complete search history.

(56) References Cited

U.S. PATENT DOCUMENTS 8,015,924 B1 * 9/2011 Maines ................. F42B 12/207
102/493
12,158,330 B2 * 12/2024 Rowe ...................... F42B 5/285
2014/0224144 A1 * 8/2014 Neugebauer .............. F42B 5/26
102/470

(Continued)

FOREIGN PATENT DOCUMENTS

CA 2570743 A1 6/2008
WO 2022234245 A1 11/2022

OTHER PUBLICATIONS

International Search Report and Written Opinion received for PCT/GB2022/050967. Mailed: Jul. 20, 2022. 8 pages.

(Continued)

*Primary Examiner* — James S Bergin
(74) *Attorney, Agent, or Firm* — Finch & Maloney PLLC

(57) ABSTRACT

The invention relates to a method of improved ammunition production, more specifically to a cellular structure end cap, suitable for an ammunition round, said end cap comprising a porous 3D spatial structure in the shape of said end cap, wherein in said porous 3D spatial structure comprises a surface skin.

20 Claims, 6 Drawing Sheets

(56) References Cited

U.S. PATENT DOCUMENTS

Figure 1:
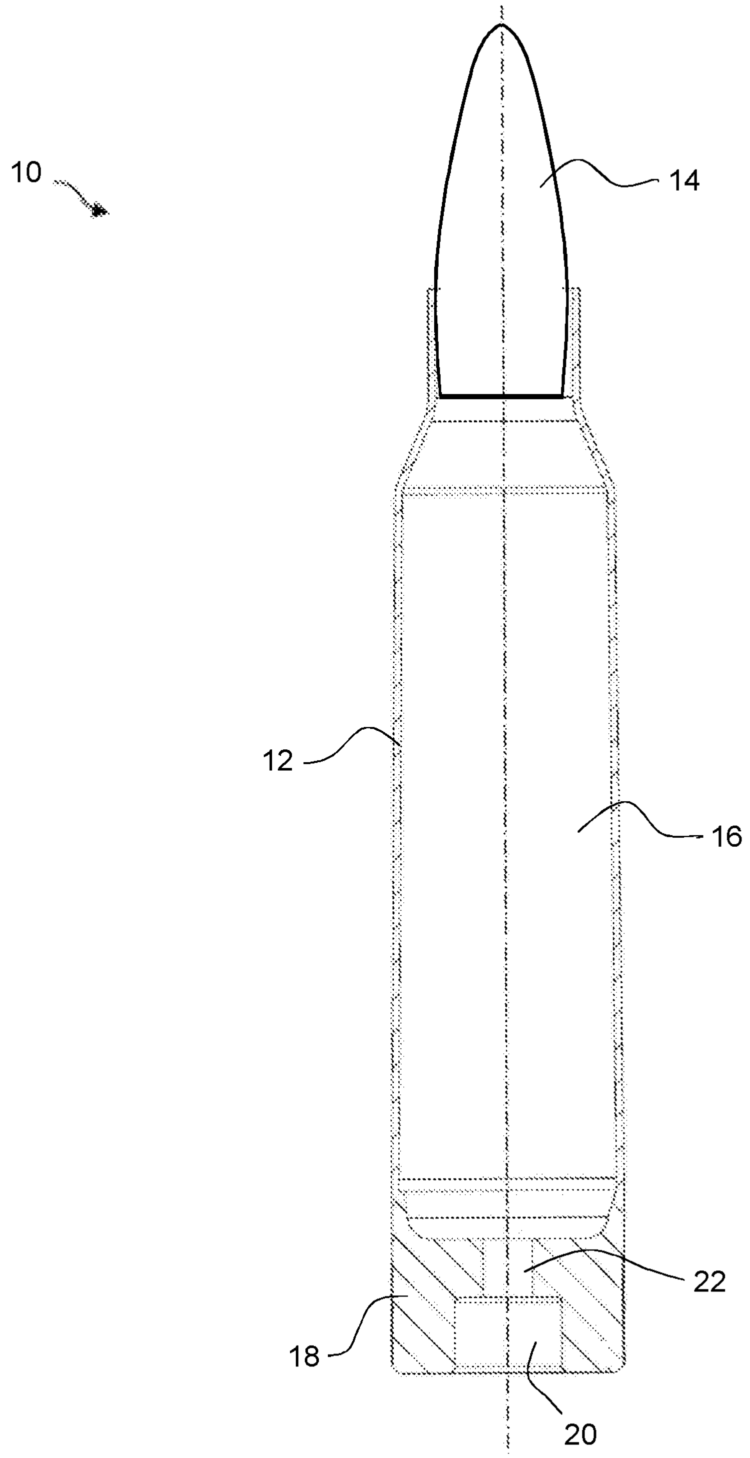
Fig 1 (prior art)

| | | | | |
|---|---|---|---|---|
| 2016/0003601 | A1 * | 1/2016 | Burrow | C22C 38/58 102/467 |
| 2017/0089674 | A1 * | 3/2017 | Burrow | F42B 5/285 |
| 2018/0321020 | A1 | 11/2018 | Evans | |
| 2019/0011232 | A1 | 1/2019 | Boss et al. | |
| 2020/0400411 | A9 | 12/2020 | Burrow | |
| 2024/0230290 | A1 * | 7/2024 | Rowe | F42B 5/285 |

OTHER PUBLICATIONS

Search Report under Section 17(5) received for GB Application No. 2106391.2 dated Oct. 27, 2021. 3 pages.

Extended EP Search Report received for EP Application No. 21275054.1 dated Oct. 22, 2021. 7 pages.

* cited by examiner

LIGHTWEIGHT END CAP

The invention relates to a lightweight ammunition end cap, more specifically to a lightweight cellular structure with a porous three dimensional structure end cap, suitable for use with lightweight metal and polymer tube cartridges.

The manufacture of rounds for use in small arms follows a standardised process and involves the separate construction of a projectile and a case the latter comprising a primer and a propellant to propel the projectile. Both the case and projectile are typically formed from a ductile material that is capable of being reshaped through a series of dies. The projectile and case components are joined as part of the final stages of the process to form the round, which then undergoes a quality check.

The formation of brass cartridge cases is well known in the art, the cartridge cases are initially formed from a metal cup, these are commonplace components used in the drawing process for high velocity rounds, those typically used in rifled barrels. The metal cup is typically passed through a series of dies to form a longer, thinner metal cylinder. The base of the metal case tube is shaped to receive a percussion cap (primer cap) and ejection grooves, and end cap.

To reduce the burden on the user, new lightweight materials such as modern engineering polymers and stainless steel are being used in place of brass for the case.

According to a first aspect of the invention there is provided a cellular structure end cap, suitable for an ammunition round, said end cap comprising a porous 3D spatial structure in the shape of said end cap, wherein in said porous 3D spatial structure comprises a surface skin; wherein said surface skin provides a gas tight seal.

The cellular structure reduces the mass of the end cap without compromising the function of the end cap or the cartridge case.

The end cap (head stamp) comprises a rim, typically an ejector groove for locating with an ejection mechanism, a first cavity—the cap chamber for receiving a primer cap, and a second cavity—a fire hole, which is through-hole through which the primer cap's energetic output travels to initiate the gun propellant located in the adjoining cartridge case. The surface skin must at least be located around the cap chamber, such that all of the gases that evolve from the primer cap do not leak out of the end cap and only flow through the firehole to the cartridge case and propellant located therein.

The cellular structure may be selected from a metal, metalloid, metal alloy, polymer, ceramic or composites thereof. The metals may be selected from any suitable metal, preferably low density metals, preferably high strength metals. The use of high density metals may be offset by having large void volumes. The metal may selected from any metal or alloy thereof, preferably a metal with a density lower than 10 $gcm^{-3}$. Preferably the metals are titanium, steels, or aluminium and their alloys thereof.

The cellular end cap may further comprise a binder matrix, which may be added to aid the deposition, or formation of the cellular structure, the binder matrix may be selected from ceramics, polymers, further metals. The binder matrix may act as a porogen, such that it may be removed from the final structure, to furnish the void structure within the cellular end cap.

The cellular structure may be any porous three dimensional structure, such as for example honeycomb, lattice, mesh or foamed structure. The supporting structures (beams) may be formed into regular patterns that tessellate along any axis with no gaps between cells to provide a uniform pattern. The supporting structures may be non-uniform, depending on the method of manufacture. A lattice structure is a space-filling unit cell that can be tessellated.

The external skins form a closed cellular structure proximate to or on the surface of the cellular structure, such that in use the energetic output from the primer cap is only allowed to flow through the fire hole, and into the case, to initiate the gun propellant. The use of a cellular structure without external skins, would allow the energetic output from the primer to escape through the open cells. Further, the gas formed as a result of the burning propellant, may also vent back through an open cellular structure, outwardly from the end cap, thereby reducing the pressure in the case.

The external skins may be a solid layer of the material, which forms the supporting structure, on the outermost surface. Alternatively, an outer region of the voids may be cause to be filled, such as with powdered material, solid material (which may be the same material being used to form the supporting structure) this may form a series of closed cells. The external skins are preferably a solid layer (skin) formed on the surface of the cellular endcap, to form a gas tight seal between the output of the primer and the case. There may be regions of the surface of the cellular end cap that do not have an external skin, if they do not form part of the gas tight seal region between the output of the primer and the case.

The cellular structure may have a void fraction in the range of 5% to 95%, more preferably 10%-80%, more preferably 30% to 80%. The use of less than 10% fraction of voids, will provide an end cap that functions, but the reduction in mass, may not be significant. Further, void fractions above 90% are possible, however, the structure may become brittle, the cellular end cap and case (ie final cartridge case), is designed to be ejected from the gun, intact.

The cells of the cellular structure may be open celled or closed cells. The use of closed cells, may enhance the gas tight seal required in the region between the output of the primer and the case.

The end cap may comprise regions of solid material as reinforcement regions or splines to the cellular structure. These reinforcement regions are in addition to the external skin surfaces of the cellular end cap.

The end cap may be formed by any suitable means for producing a cellular structure. The cellular structure has supporting structures, (ie solid material) with voids (interstices, cavities) in between. The manufacture may be formation of the support structures, or the use of a solid starting material and then removing material to form voids, or the use of expanding reagents to form voids in an otherwise solid material.

The use of additives such as porogens, can be incorporated in the final material, and then the porogens are removed to create the voids.

The of expanding microspheres, injecting high pressure gas may cause foamed materials to be produced.

Preferably the support structures are formed by additive layer manufacture (ALM) such that a material, preferably a metal (and/or binder if required) is deposited layerise to build up the cellular end cap. The ALM process may print out (deposite) a final shaped device, with external skins.

The density is preferably much less than the density of a solid, the use of ALM deposition allows the formation of solid regions for reinforcement. Further the use of ALM allows the selected formation of regions of different void volume %, (ie different densities of material) such as that regions of the end cap that experience larger shock forces may have a lower void fraction, to provide for greater compression stress resilience.

The further metal when present as part of a binder matrix will have a lower density than the metal. The further metal may be selected from any suitable metal, preferably the further metal powder may have a density lower than 8 $gcm^{-3}$, such as, for example aluminium, magnesium, titanium, or cobalt.

The polymer binder may be any polymer or graphite, the polymer binder may be such as for example be a resin binder, such as for example acrylate binder such as, for example, methylmethacrylate MMA), an acrylic binder, an epoxy binder, a urethane & epoxy-modified acrylic binder, a polyurethane binder, an alkyd based binder.

The ceramic binder may be independently selected from, oxides, such as those of alumina, beryllia, ceria and zirconia, or non-oxides, such as carbides, carbides, nitrides or silicides, and composites of oxides and non-oxides.

The cellular end cap may further comprise filler materials, so as to form a hybrid composite, that is a mixture which comprise more than one component such, as for example metal or binder and/or filler materials. The filler materials may be the addition of wires, fibres or particulates, such as graphitic materials and or ceramic materials. The use of fibre or particulates may be in the range of from 0-50% vol fraction.

Conventional ammunition round comprises an end cap, a case tube (the case tube and end cap forming a cartridge case), and a projectile, located in the end of the final cartridge case.

According to a further aspect of the invention there is provided an ammunition round, comprising an end cap according to any one of the preceding claims, a case, said case and end cap forming a cartridge case, a primer cap, propellant and a projectile located in said cartridge case arranged to form said ammunition round, wherein said surface skin of the end cap provides a gas tight seal for the output of the primer cap.

The case material may be any commonly used material such as a metal, especially non-brass metals, a polymer case or an MMC material or cellular structure material as defined herein for the end cap. The use of a brass case in this combination, adds mass, so whilst not desirable, the combination is conceivable. The metal case may be a steel, aluminium, titanium or other lightweight metals.

The cartridge case, that is the end cap and case may contain only cellular structure materials, such that the entire case may be formed in a single operation.

The cartridge case may be formed by the joining of the cellular structure end cap as defined herein and a metal case, the join may be mechanically joined, welded, adhesively bonded or combination thereof. Preferably a mechanical join in the form of a rivet.

The cellular structure end cap in may be formed in-situ on the metal case, such that the formation of the cellular structure end cap also fastens the cellular structure end cap to the metal case.

In a preferred arrangement the cartridge case may be formed by the joining of the cellular structure end cap as defined herein and a metal case, the join may be mechanically joined, welded, adhesively bonded or combination thereof. Preferably a stainless steel case may be joined to the cellular structure end cap by a mechanical a rivet join with a sealant or weather seal between the end cap and case.

The use of polymer cases is gaining momentum, however, they have all relied on using brass end caps, for ease and cost. The polymer case may be formed in-situ with the end cap as defined herein, in order to allow the adhesion of the polymer case to the cellular structure end cap. The end cap may further comprise an elongate protrusion to provide a greater surface area of engagement with said polymer case. The polymer case can be formed separately from the end cap and the two components joined by heating or adhesively bonding the two together.

The elongate protrusion may further comprise surface projections, surface keying, to provide further increase in the strength of the mating between the cellular structure end cap and the polymer case. Surface projections may interlock with any fibrous ply or fibrous filler material in the polymer case, to provide further strength with a fibre reinforced polymer composite case.

The polymer case may be formed in-situ around the cellular structure end cap, by metal insert moulding techniques. Some part or all of the polymer case and/or polymeric coupling may be integrally formed by metal insert moulding. The cellular structure end cap may in a preferred process be loaded into a die cavity where a polymeric material is moulded around it to form a casing which will provide the final net shape for the cartridge case.

Metal insert moulding is the insertion of a metal component during the moulding, casting, forming process of a polymer component and is well known to those proficient in said art. The cellular structure end cap may be inserted before, during or even post forming process, before the polymer moulding process has resulted in a final cured product. The polymer moulding processes may be selected from any known process, such as, for example, injection, compression, GRP, extrusion, extrusion blow moulding, SMC/DMC, structural foam, and rotational moulding.

The polymeric case when formed as a separate component may be affixed to the metal coupling protrusion by a thermal weld, ultrasonic weld, heat shrink, adhesive, crimp, clamped, interlocked with said metal protrusion, to form a gas tight seal. The weld may be any thermal heat source, such as, for example induction, flame, laser or ultrasonic.

The polymer case may comprise multiple sections, such as, for example a polymeric coupling end, and an open end (mouth) for receiving a projectile, or the mouth end may be closed for forming a blank.

The polymer case may comprise one or more intermediate sections. The sections, polymeric coupling end, and projectile/blank end may have different rigidities, and physical properties. The polymer case may have one, two, three or more sections, each section may be independently selected from a different polymer, or the same polymer with different chemical or physical properties, depending on densities, curing agents, curing process, fillers, fibres or other additives.

The polymer case may be formed as a monolithic polymer case. The monolithic polymer case may have different chemical or physical properties, at various points along its construction, by, varying densities or variable loading of fillers, fibres or other additives therein.

The polymer case may be located at least in part over the outer diameter of the second open end of the closed cellular structure end cap.

In one arrangement there may be a further circumferential groove below the ejector groove, to accommodate a retaining portion of polymer case.

The polymer case preferably comprises a polymeric coupling end, which engages with the elongate protrusion. The polymeric coupling end and elongate protrusion may be a male and female co-operative locking arrangement.

In a preferred arrangement the polymeric coupling end is a female coupling portion. Preferably the female coupling portion comprises two polymeric skirt portions which engage with the elongate protrusion. The two skirt portions may envelope the elongate protrusion. The two skirt portions may be an outer skirt portion and an inner skirt portion. The outer skirt portion may form part of the outside of the polymeric case. The outer polymeric skirt portion may comprise the retaining portion, which engages with the further circumferential groove, which is located under the ejection groove.

The inner skirt portion goes inside the head unit, which will form part of the powder retaining cavity of the formed cartridge case. The inner polymeric skirt portion may comprise a further retaining portion, which engages with the flash hole aperture as formed internally within the cellular structure end cap.

The polymeric case may be formed from any polymer, such as for example, thermoset, thermoplastics, such polymers may be block polymers, co-polymers, elastomers, fluoroelastomers and combinations thereof. The polymers used in polymer cartridge cases are known in the art.

The polymeric case may be a fibre reinforced polymer composite case. The fibres may be fibre ply, fibres, chopped fibre, fibre threaded windings. The fibres may be any commonly used fibre such as, for example, glass, carbon, polymers, such as, for example polyarimid, metals.

The polymeric case may comprise particulate fillers, such as, for example, filaments, leaf or other particles.

The particulate fillers may be any material, such as, for example metals, metalloids, ceramics, metal alloys thereof. The particulate fillers may be nano particulate, or multimodal loaded polymer composites. The nano particulate may be carbon, such as for example carbon nanotubes, graphene, graphitic fillers.

The fibres and/or particulate fillers may be present in the range of 5 to 80%, and the remainder the respective curable monomer to form the selected polymer case.

There may be some fibres affixed to the elongate protrusion prior to affixing or inert metal moulding the polymeric case, so as to provide a composite-metal bond.

The combination of a lightweight cellular structure end cap and a lightweight case, whether stainless steel, titanium or a polymer provides a leap forward.

The calibre may be selected from any calibre round.

Exemplary embodiments of the device in accordance with the invention will now be described with reference to the accompanying drawings in which: —

FIG. 1 prior art brass cartridge case.

Figure 2:
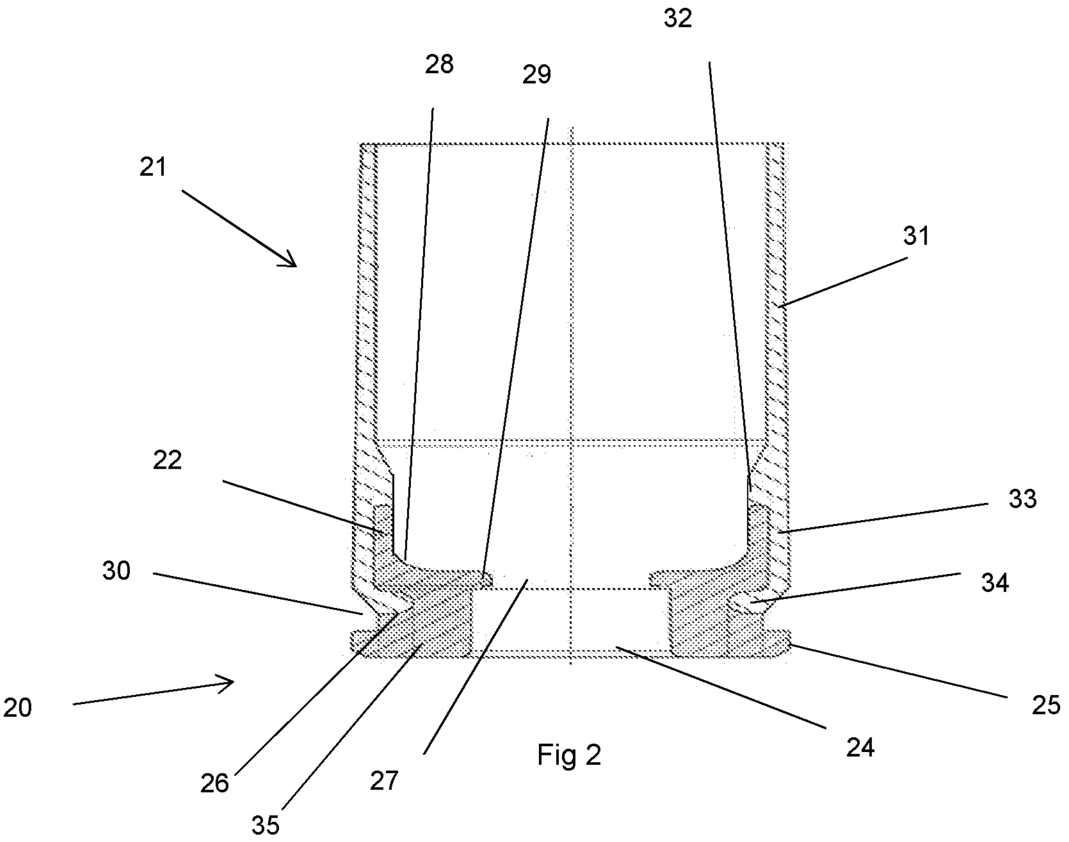
Figure 3:
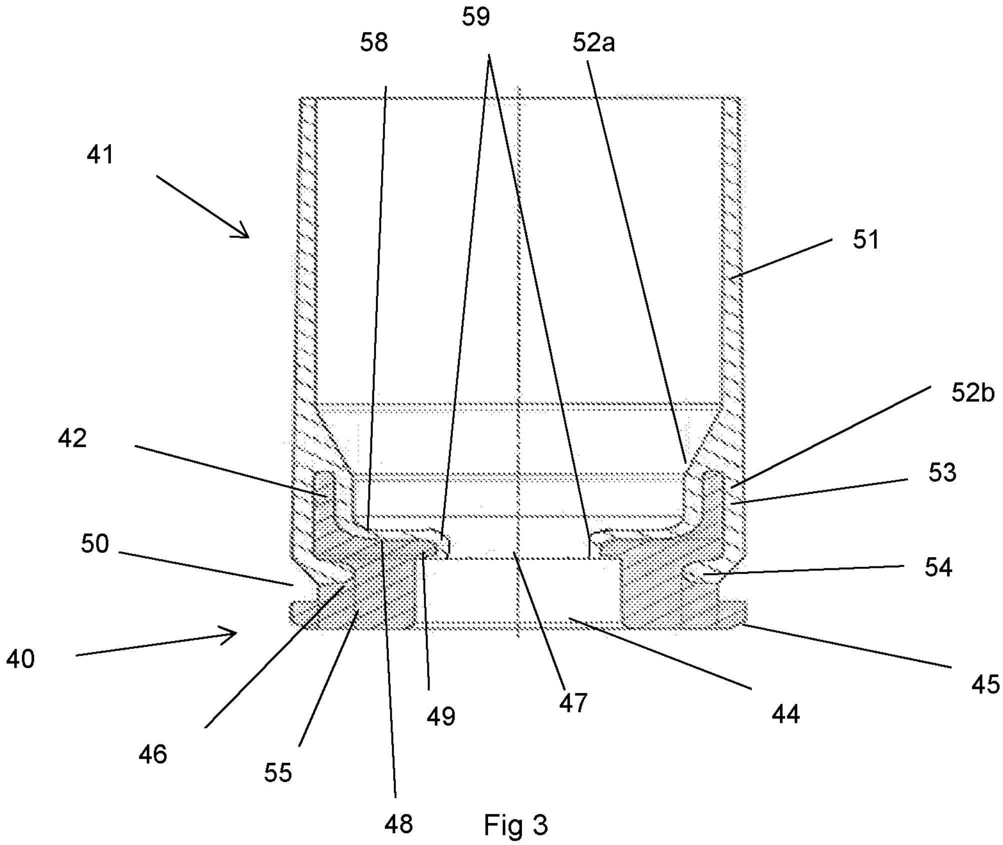

FIG. 2 shows a bonded arrangement of a polymer case and cellular structure cellular structure end cap FIG. 3 shows an alternative bonded arrangement of a polymer case and cellular structure end cap unit.

Figure 4A:
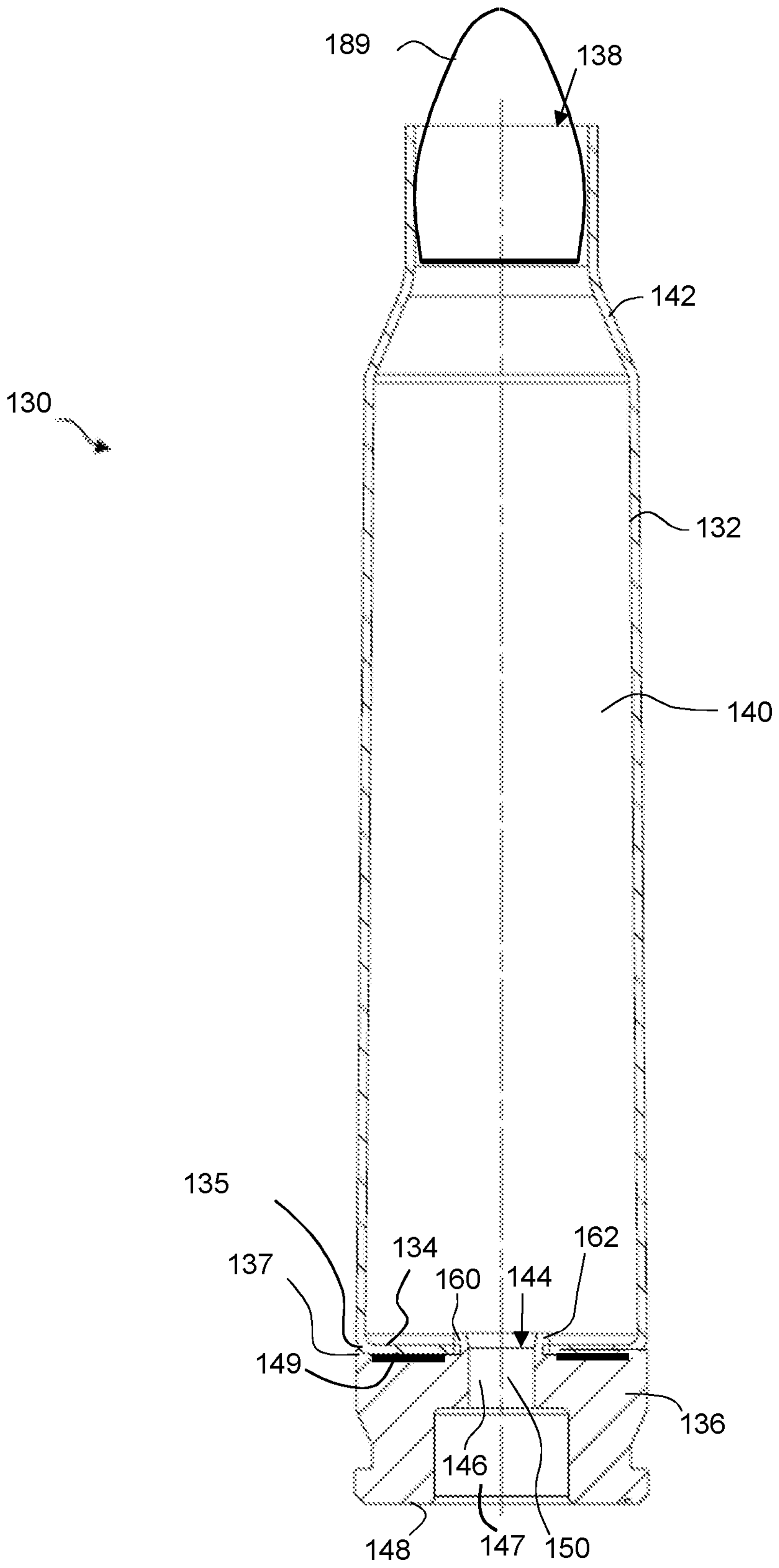
Figure 4B:
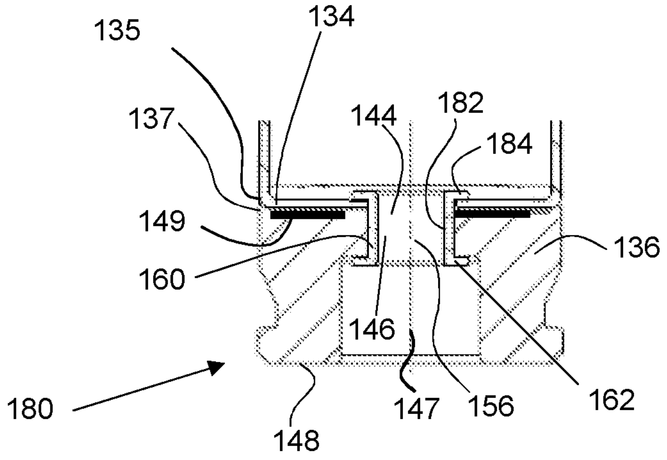
Figure 5:
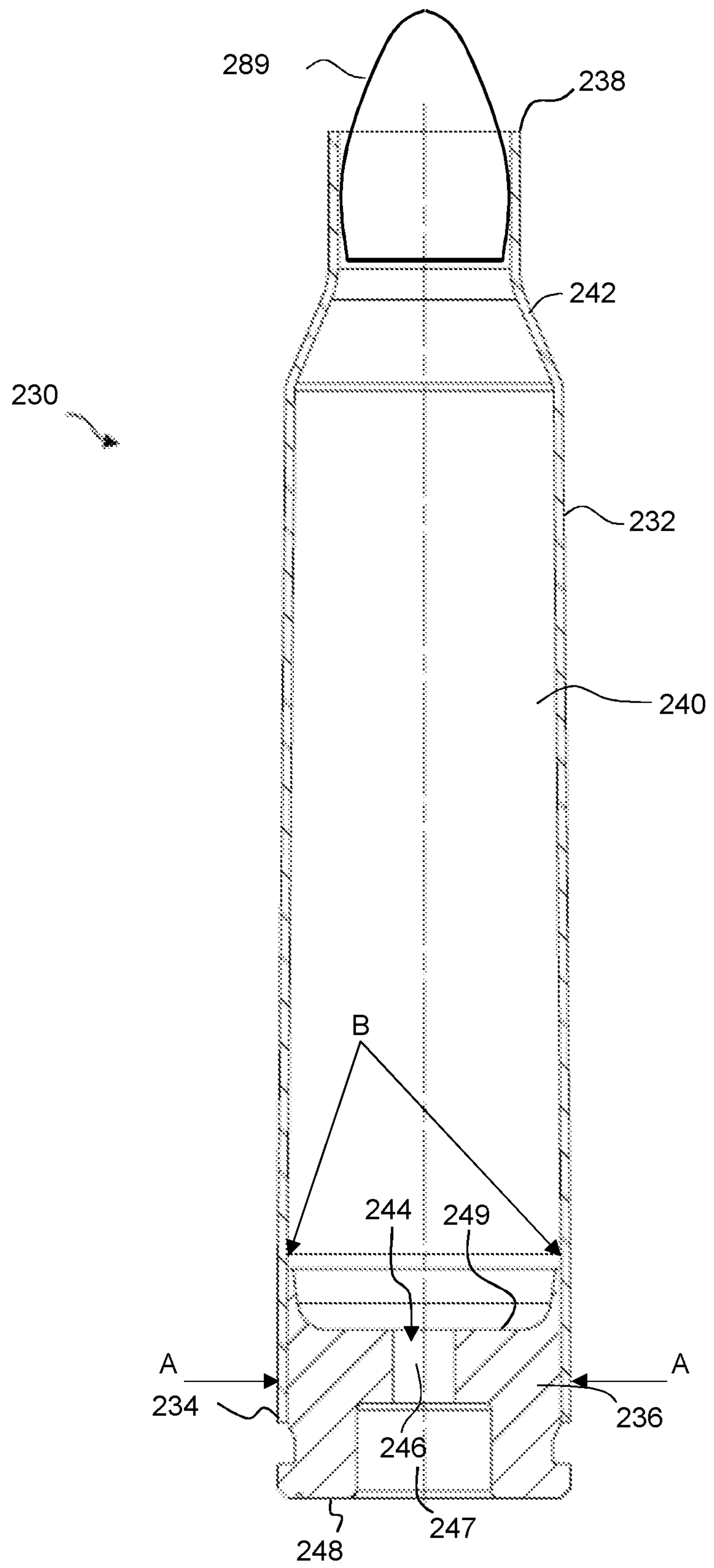

FIGS. 4*a* and 4*b* show mechanical fastening of a metal case and cellular structure end cap unit FIG. 5 shows a laser weld fastening of a metal case and cellular structure end cap unit.

Figure 6:
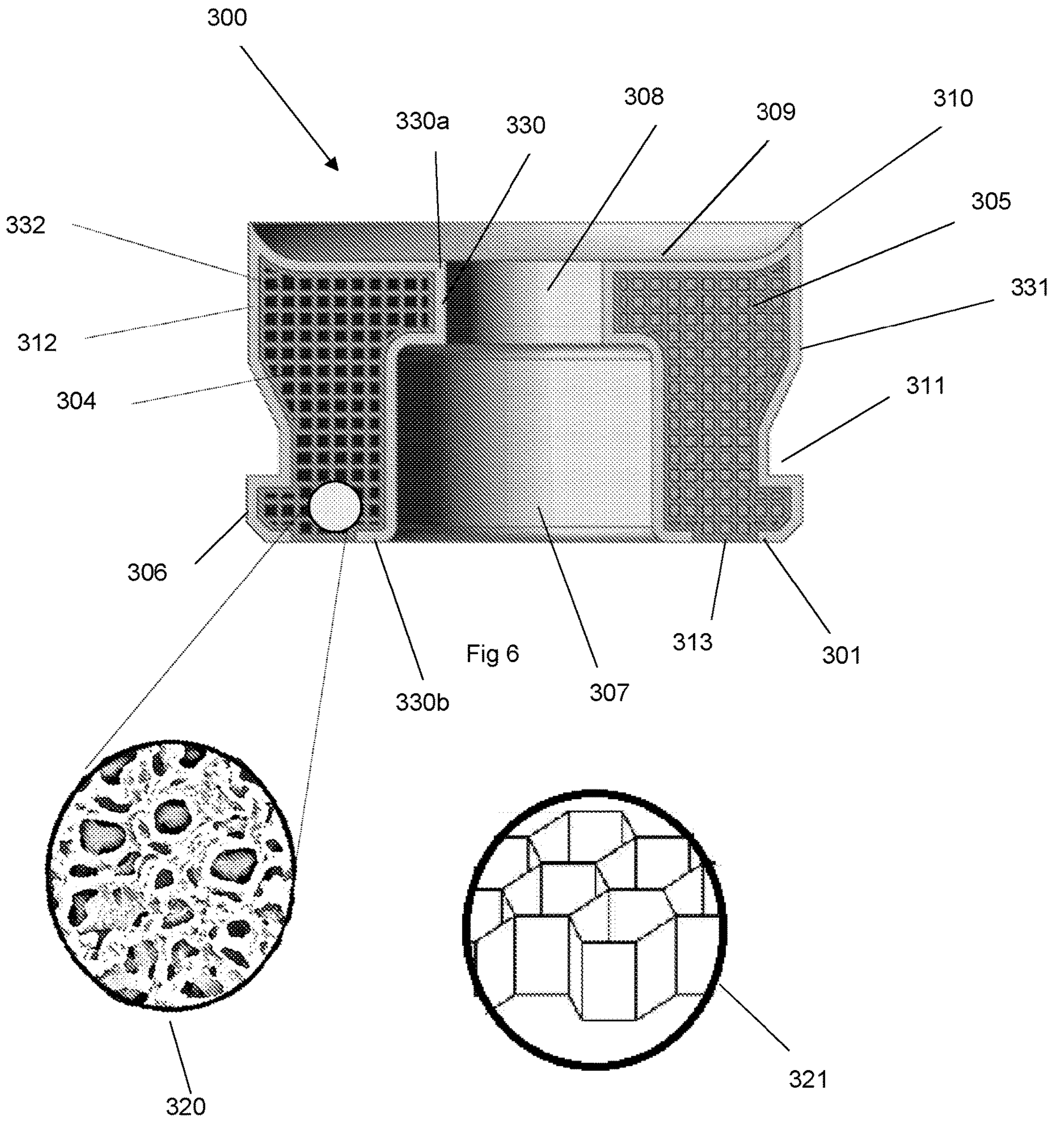

FIG. 6 shows a metal matrix composite cellular structure end cap

Turning to FIG. 1 there is a prior art, conventional cartridge casing 10. The cartridge assembly 10 comprises a casing 12 and a projectile 14. The casing 12 has a hollow section 16, which will contain propellant for displacement of the projectile 14. The casing 12 further comprises a head 18 at the end opposite to the projectile 14 which comprises a chamber 20 for a percussion cap, and a flash tube 22 for communication of an ignition charge from the percussion cap to the inside of the casing 12 and thus the propellant. The skins of the chamber 16 are formed integrally with the head 18. Such a cartridge casing may typically be formed of brass. This material choice has many advantages, for example, it is relatively easy to form into the desired shape. However, brass has demerit in that it is also relatively dense, and hence the casing 12 forms a relatively large percentage of the mass of the whole cartridge Referring to FIG. 2, there is provided a head unit 20, which comprises an enlarged head rim 25, on a cellular structure head unit 35. The cellular structure head unit 35, comprises an at least one further circumferential groove 26, which accommodates a retaining portion of the polymer case 34. The ejector groove 30 is in part formed by the enlarged head rim 25, and the retaining portion of the polymer case 34. The cellular structure metal coupling protrusion 22 engages with the polymer case 31, at the polymeric coupling end 33, and the forms an abutting engagement 32.

The cellular structure head unit 35, comprises a primer cavity 24, and a flash hole 27, to allow the output from the primer (removed for clarity) to transfer through to propellant in the final cartridge. The internal features such as the internal shoulder 28 and flash hole aperture 29, are produced during the cellular structure forming process.

Referring to FIG. 3, there is provided a head unit 40, which comprises an enlarged head rim 45, on a cellular structure head unit 55. The cellular structure head unit 55, comprises an at least one further circumferential groove 46, which accommodates a retaining portion of the polymer case 54. The ejector groove 50 is in part formed by the enlarged head rim 45, and the retaining portion of the polymer case 54. The cellular structure coupling protrusion 42 engages with the polymer case 51. The female polymeric coupling end 53, comprising the two skirt portions 52*a* and 52*b* envelope the cellular structure coupling protrusion 42.

The head unit 55, comprises a primer cavity 44, and a flash hole 47. In this arrangement the flash hole 47 is formed by the inner polymeric skirt portion 52*a*, which comprises a further retaining portion 59, which engages with the flash hole aperture 49. The further retaining portion 59 forms a narrower flash hole aperture 47. The flash hole 47 allows the output from the primer (removed for clarity) to transfer through to propellant in the final cartridge. The inner skirt portion 52*a* extends 58 and attaches to the internal shoulder 48 along its length.

The outer polymeric skirt portion 52*b* extends down the outside the metal coupling protrusion 42. The outer polymeric skirt 52*b* and enlarged head rim 45 have substantially the same diameter.

Turning to FIG. 4*a* shows a light weight metal cartridge casing 130. The cartridge casing 30 is configured for use in a rifled barrel of a gun, firearm or other such weapon.

The cartridge casing 130 comprises a casing tube 132 having a first end 134 which forms a base of the casing tube 132. The skins of the casing tube 132 turn at a corner edge 135 to define the first end 134. The corner edge 135 may have a radiussed, or arcuate, cross-section.

The casing tube 132 abuts at least part of a cellular structure head cap 136 provided adjacent the first end 134. The cellular structure head cap 136 is configured to support and reinforce the base of the casing tube 132 to prevent it from swelling and rupturing during operation. In part it achieves this by providing reinforcement to the end wall of the casing tube 132 which abuts the head cap 136.

Additionally, the cellular structure head cap 136 is provided with a shoulder edge 137. The shoulder edge 137 may be formed integrally with the cellular structure head cap 136.

The shoulder edge 137 is provided towards the outer edge of cellular structure head cap 136, and extends in a longitudinal direction away from the head cap 136. The shoulder edge 137 may have a radiussed, or arcuate, cross-section. The corner edge 135 and shoulder edge 137 may be complementary in shape.

The corner edge 135 and shoulder edge 137 are sized and configured such that when the first end 134 of the casing tube 132 is seated on the cellular structure head cap 136, the corner edge 135 of the casing tube 132 sits within the space, or region, defined by the shoulder edge 137 of the cellular structure head cap 136. That is to say, the corner edge 135 and shoulder edge 137 are sized and configured such that when the first end 134 of the casing tube 132 is seated on the cellular structure head cap 136, the shoulder edge 137 of the cellular structure head cap 136 surrounds, encircles and/or bounds the corner edge 135 of the casing tube 132. Put another way, when the first end 134 of the casing tube 132 is fitted and located on the cellular structure head cap 136, the shoulder edge 137 of the cellular structure head cap 136 is substantially in contact with the whole of the circumference of corner edge 135 of the casing tube 132, and the shoulder edge 137 is configured to support loads induced in it by expansion of the casing. Thus, in operation, the shoulder edge 137 of the cellular structure head cap 136 prevents the corner edge 135 of the casing tube 132 from moving radially outwards, for example beyond its original circumference or the circumference of the cellular structure head cap 136.

The casing tube 132 further comprises a second end 138, which is open and configured to receive a projectile 189 opposite to the first end 134. The second end 138 has a diameter which may be substantially the same as, or less than, the diameter of the first end 134. In the example shown the diameter of the second end 138 is substantially less than the diameter of the first end 134.

The walls of the casing 132 define a substantially cylindrical thin walled chamber 140. The walls of the casing tube 132 are configured to contain a pressure in the chamber of up to about 500 MPa.

The cellular structure head cap 136 defines a passage 146 which extends all of the way through the cellular structure head cap 136 which in use will be a flash tube. The flash tube extends into a chamber 147 which, in use, will house a percussion cap (sometimes referred to as a "primer"). Thus the cellular structure head cap 136 has a percussion side 148 which, in use, faces away from the casing tube 132. The orifice 144 in the first end 134 of the casing tube 132 and head cap passage 146, when assembled in alignment, define a flash passage 150 which extends between the head cap percussion side 148 and the inside of the casing tube 132.

The cellular structure head cap 136 and casing tube 132 are held together by a deformable member 160. The deformable member 160 extends from the passage 146 of the cellular structure head cap 136 through the orifice 144 in the first end 134 of the casing tube 132 and aligns the passage 146 with the orifice 144.

In the example of FIG. 4*a* the deformable member 160 is provided as at least one deformable end, lip or region 162, which is deformable between a first shape (for example an undeformed configuration or state) in which the deformable member 160 may extend from the cellular structure head cap 136 through the casing tube 132 during assembly, and a second shape (for example a deformed configuration or state) which fixes the casing tube 132 and the cellular structure head cap 136 together. The deformable member 160 thus provides a mechanical joint between the cellular structure head cap 136 and casing tube 132.

In the example of FIG. 4*a* the deformable member 160 is integrally formed with the cellular structure head cap 136. The deformable member 160 is deformable by swaging the region of the lip 162 which extends beyond the wall which defines the orifice 144 of the casing tube 132 such that the lip 162 becomes pressed against the wall of the casing tube 132 and draws the cellular structure head cap 136 toward the base of the casing tube 132 to thereby clamp the casing tube 132 and cellular structure head cap 136 together.

An alternative example of a cartridge casing 180 according to the present disclosure is shown in FIG. 4*b*. The example of FIG. 4*b* is similar in many ways to the cartridge case shown in, and as described with reference to, FIG. 4*a*. Features common to the examples of FIG. 4*a* and FIG. 4*b* are referred to using the same reference numerals.

In the FIG. 4*b* example the deformable member 160 is provided as a rivet like element 182 which is provided separately to the cellular structure head cap 136 and casing tube 132. The deformable member 182 is cylindrical, hollow and thin walled. The deformable member 182 (rivet) extends along the passage 146 in the cellular structure head cap 136 and through the orifice 144 in the first end of the casing tube 132. The deformable member 182 is provided with at least one deformable end, or lip, 162 which is deformable between a first shape (for example an undeformed configuration or state) in which the deformable member 182 may extend between the casing tube 132 and the cellular structure head cap 136 during assembly, and a second shape (for example a deformed configuration or state) which fixes the casing tube 132 and cellular structure head cap 136 together. For example, the deformable end 162 of the deformable member 182 may be swaged to bring the cellular structure head cap 136 and casing tube 132 into a fixed relationship relative to one another.

The deformable end 162 of the deformable member 182 may take the form of a region of material which is configured to extend beyond the orifice 144 and passage 146 into the percussion cap chamber 147, which may then be swaged to form a clamping flange. Alternatively the deformable end 162 may be configured to extend into the casing tube 132. In such examples the deformable member 182 may be provided with a shoulder 184 of greater diameter than the orifice 144 and passage 146, on the opposite end of the deformable member 182 to the deformable region 162, such that the deformable member 182 is trapped against one side of the orifice 144 and passage 146.

Alternatively, a deformable end 162 may be provided at both ends of the deformable member 182 such that both end regions of the deformable member 182, that is to say the region which extends into the percussion cap chamber 147 and the region the extends into the casing tube 132, may be deformed to clamp against the cellular structure head cap 136 and the casing tube 132 respectively.

Put another way, the deformable member 182 is deformable by swaging either the region of a lip 162 which extends beyond the wall which defines the orifice 144 of the casing tube 132 and/or by swaging the region of a lip 162 which extends beyond the flash tube 144 into the percussion cap chamber 147. Swaging causes the lip 162 to become pressed against the wall of the casing tube 132 and/or cellular structure head cap 136 to thereby draw the cellular structure head cap 136 toward the base of the casing tube 132 to thereby clamp the casing tube 32 and cellular structure head cap 136 together.

The casing tube 132 may be formed from a metal, metallic material or metal alloy comprising, for example, aluminium or a titanium. In one example the casing tube 32 may comprise ferritic alloys, for example stainless steel. The casing tube 32 may alternatively be formed from non metallic material and/or metal-plastic composite material. The deformable member 160, i.e. the rivet 160, may be made of the same or a different material to the tube casing, for example stainless steel, titanium, brass or coated mild steel.

Turning to FIG. 5, shows an example cartridge casing 230 according to the present disclosure. The cartridge casing 230 comprises a casing tube 232 having a first end 234 which is closed by a cellular structure head cap 236. The casing tube 232 is substantially cylindrical and has an internal diameter at the first end 234 which receives the cellular structure head cap 236. The casing tube 232 bounds at least part of the cellular structure head cap 236 entered into its first end 234. The cellular structure head cap 236 is configured to support and reinforce the base of the casing tube 232 to prevent it from swelling and rupturing during operation. As will be described in more detail later, the cellular structure head cap 236 is welded to the casing tube 232, thereby fixing the cellular structure head cap 236 and casing tube 232 relative to one another.

In the context of the present disclosure, "welding" is intended to cover joining processes that produce bonding of materials by heating, which may be done with or without pressure or filler material. For example, the term is intended to encompass brazing and soldering. It may also be taken to encompass a process in which the material of one or more articles being joined are brought into a molten state to facilitate bonding. It may include a process in which the base materials melt along with a filler material.

The casing tube 232 further comprises a second end 238, which is open and configured to receive a projectile 289 opposite to the first end 234. The second end 238 has a diameter which may be substantially the same as, or less than, the diameter of the first end 234. In the example shown the diameter of the second end 238 is substantially less than the diameter of the first end 234.

The walls of the casing 232 define a substantially cylindrical thin walled chamber 240. The tube casing 232 has a substantially constant diameter along a first region of its length between the first end 234 and the second end 238. However, the cylindrical thin walled chamber 240 may have a taper (for example <1°) along at least part or all of its length.

The cellular structure head cap 236 defines a passage 246 which extends all of the way through the cellular structure head cap 236 which in use will be a flash tube (or "flash passage"). The flash tube/passage 246 extends into a chamber 247 which, in use, will house a percussion cap (sometimes referred to as a "primer"). Thus the cellular structure head cap 236 has a percussion side 248 which, in use, faces away from the casing tube 232.

The cellular structure head cap 236 further comprises a charge side 249 which, in use, defines part of the internal surface of the cartridge casing 230. Thus the flash passage 246 extends between the percussion side 248 and the charge side 249.

The cellular structure head cap 236 has an external diameter at least part way along its outer periphery sized such that it fits within the first end 234 of the casing tube 232. The relative dimensions of the internal diameter at the first end 2234 of the casing tube 232 and the external diameter of corresponding region of the cellular structure head cap 236 may be such when the cellular structure head cap 236 is located in the casing tube 232 they form an interference fit with one another.

The casing tube 232 and cellular structure head cap 236 may comprise a welded join which bonds them together in a region where they form an interference fit with one another. For example, the join may be provided around the circumference of the casing tube 232 and cellular structure head cap 236 in a region where they interface with one another. Such a region is indicated with arrows "A". The join may be a through weld or stake weld.

Alternatively the casing tube 132 and cellular structure head cap 236 may comprise a join which bonds them together in the interior of the casing tube 232, for example in a region around a circumferential edge of an interface between the casing tube 232 and the cellular structure head cap 236. Such a region is indicated with arrows "B".

The weld may achieved by laser welding. Alternative weld joins may be provided which brought only material of the casing tube 232 into a molten state, or brought material of both the casing tube 232 and cellular structure head cap 236 into a molten state. The weld join may have been provided by any one of the welding processes as hereinbefore defined.

FIG. 6 provides a cellular structure end cap 300, comprising a rim 306, an ejector groove 311, formed as a recess in the side wall 312 and rim 306, for locating with an ejection mechanism (not shown) in a rapid fire gun. The end cap 300 comprises a first cavity the cap chamber 307 for receiving a primer cap (not shown), and a second cavity—a fire hole 308, which is through-hole through which the primer cap's energetic output travels to initiate the gun propellant located in the adjoining cartridge case. The rear face 301 typically comprises the manufactures makers mark, for identification purposes. The end cap may be formed from a closed cellular structure 305, or an open cellular structure 304, or a foamed structure 320 or honeycomb structure 321.

The cellular structure end cap 300 may be secured to the case (not shown), via an abutment to the upper surface 309. The abutment may be reinforced by mechanical, chemical or physical fastenings. The protrusion 310, may be a shoulder for engagement with a metal case, or the protrusion 310 may be caused to be elongated to provide a greater surface area for use with a polymer case.

The external skin 330, is a solid layer of material, to form a skin/outer layer, ie sandwich like structure. The external skin must run from at least 330*b* to 330*a*, to provide a gas tight seal region between the output of the primer (located in cap chamber 307) and the case (not shown) which would join ay 330*a*. The external skin 331 may extend around the entire surface area of the end cap 300, or there may be a region, where there is break 313 in the external skin. It is clear that the break 313 does not form a viable gas escape path from the region defined by 330*a* to 330*b*.

The end cap 300 may be manufactured using additive layer manufacturing (ALM). Here, each support structure 332 is built up in a series of layers such that the lattice structure 304 and solid external skin 330 are formed of the same material sequentially without interruption. In other words, the end cap 300 features which are formed from a lattice structure, are integrally formed.

The invention claimed is:

1. An ammunition round, comprising:

a cellular structure end cap, said cellular structure end cap comprising a porous three-dimensional (3D) spatial structure in the shape of said cellular structure end cap, wherein said porous 3D spatial structure comprises a surface skin, wherein the porous 3D spatial structure is a honeycomb, lattice, or foamed structure, and wherein the porous 3D spatial structure has a void fraction in the range of 30%-80%;

a case, said case and cellular structure end cap forming a cartridge case;

a primer cap;

propellant; and a projectile located in said cartridge case.

2. The ammunition round of claim 1, wherein the cellular structure end cap is a metal cellular structure end cap, a metal alloy cellular structure end cap, a metalloid cellular structure end cap, a polymer cellular structure end cap, a ceramic cellular structure end cap, or a composite cellular structure end cap.

3. The ammunition round according to claim 1, wherein the cellular structure end cap comprises regions of solid material as reinforcement regions to the porous 3D spatial structure.

4. The ammunition round according to claim 1, wherein the cellular structure end cap is formed by additive layer manufacture.

5. The ammunition round of claim 1, wherein said case is mechanically joined to the cellular structure end cap by a deformable member.

6. The ammunition round according to claim 1, wherein the case is a metal case, a metalloid case, an alloy case, or a polymer case.

7. The ammunition round according to claim 6, wherein the case is a polymer case, and wherein the polymer case is formed in-situ over the cellular structure end cap, and wherein said cellular structure end cap further comprises an elongate and solid protrusion to engage with said polymer case.

8. The ammunition round according to claim 1, wherein the case is a metal case, the cellular structure end cap is a composite cellular structure end cap, and said metal case is mechanically joined, laser welded, or bonded to the composite cellular structure end cap.

9. The ammunition round according to claim 8, wherein the mechanical join is a rivet.

10. An ammunition round, comprising:

a cellular structure end cap comprising a porous three-dimensional (3D) spatial structure, the porous 3D spatial structure having a surface skin, wherein the porous 3D spatial structure is a honeycomb, lattice, or foamed structure, and wherein the porous 3D spatial structure has a void fraction in the range of 30%-80%; and a case comprising a metal, a metalloid, or a metal alloy, the case and cellular structure end cap forming a cartridge case.

11. The ammunition round according to claim 10, further comprising:

a primer cap; and a projectile located in said cartridge case, wherein said surface skin of the porous 3D spatial structure provides a gas tight seal for an output of the primer cap.

12. The ammunition round according to claim 10, wherein the case is mechanically joined, laser welded, or bonded to the cellular structure end cap.

13. The ammunition round according to claim 10, wherein the case is mechanically joined to the cellular structure end cap by a deformable member having at least one deformable end.

14. The ammunition round according to claim 10, wherein the cellular structure end cap comprises regions of solid material as reinforcement regions to the porous 3D spatial structure.

15. The ammunition round according to claim 10, wherein the case is mechanically joined to the cellular structure end cap by a mechanical rivet join that includes the clamping flange, the ammunition round including a sealant between the cellular structure end cap and the case.

16. The ammunition round according to claim 10, wherein the cellular structure end cap includes:

regions of different void volume %, such that one or more regions of the cellular structure end cap that experience relatively larger shock forces than other regions of the cellular structure end cap have a lower void fraction;

a lattice structure that includes tessellated space-filling unit cells; or a honeycomb structure.

17. The ammunition round according to claim 10, wherein the case is a metal case, the cellular structure end cap is a composite cellular structure end cap, and the metal case is mechanically joined to the cellular structure end cap by a deformable member having at least one deformable end.

18. An ammunition round, comprising:

a cellular structure end cap comprising a porous three-dimensional (3D) spatial structure, the porous 3D spatial structure having a surface skin, wherein the porous 3D spatial structure is a honeycomb, lattice, or foamed structure, and wherein the porous 3D spatial structure has a void fraction in the range of 30%-80%;

a case comprising a metal, a metalloid, or a metal alloy, the case and cellular structure end cap forming a cartridge case;

a primer cap; and a projectile located in said cartridge case, wherein said surface skin of the porous 3D spatial structure provides a gas tight seal for an output of the primer cap;

wherein the case is mechanically joined to the cellular structure end cap by a clamping flange.

19. The ammunition round according to claim 18, wherein the clamping flange is part of a deformable member that extends along a passage in the cellular structure end cap and through an orifice of the case, the clamping flange fixing the case and cellular structure end cap together.

20. The ammunition round according to claim 18, wherein the clamping flange is part of an element, and the element either:

is integral with the cellular structure end cap and extends from the cellular structure end cap through an orifice of the case, the clamping flange fixing the case and cellular structure end cap together; or is separate from both the cellular structure end cap and the case, the clamping flange being one of a first clamping flange and a second clamping flange, the element extending along a passage in the cellular structure end cap and through an orifice of the case, the first and second clamping flanges fixing the case and cellular structure end cap together.

* * * * *